United States Patent

Melvin et al.

[11] Patent Number: 5,282,646
[45] Date of Patent: Feb. 1, 1994

[54] MULTI-CHAMBER AIR BAG WITH DISPLACEMENT RESPONSIVE VALVE

[75] Inventors: John W. Melvin, Ann Arbor; Jack L. Jensen, Highland, both of Mich.

[73] Assignee: General Motors Corporation, Detroit, Mich.

[21] Appl. No.: 19,182

[22] Filed: Feb. 16, 1993

[51] Int. Cl.⁵ .............................................. B60R 21/24
[52] U.S. Cl. ................................. 280/729; 280/728 R; 280/740; 280/742
[58] Field of Search ............... 280/729, 728, 732, 734, 280/742, 740, 743 R, 743 A

[56] References Cited

U.S. PATENT DOCUMENTS

| | | | |
|---|---|---|---|
| 3,573,885 | 4/1971 | Brawn et al. | 280/150 |
| 3,586,347 | 6/1971 | Carey et al. | 280/729 |
| 3,642,303 | 2/1972 | Irish et al. | 280/150 AB |
| 3,752,501 | 9/1973 | Daniel et al. | 280/729 |
| 3,768,830 | 10/1973 | Hass | 280/729 |
| 4,111,458 | 9/1978 | Okada et al. | 280/739 |
| 4,262,931 | 4/1981 | Strasser et al. | 280/729 |
| 4,360,223 | 11/1982 | Kirchoff | 280/729 |
| 4,500,114 | 2/1985 | Grey, Jr. | 280/742 |
| 4,842,300 | 6/1989 | Ziomek et al. | 280/732 |
| 5,016,913 | 5/1991 | Nakajima et al. | 280/738 |
| 5,044,663 | 9/1991 | Seizert | 280/730 |
| 5,160,164 | 11/1992 | Fischer et al. | 280/730 A |
| 5,172,933 | 12/1992 | Strasser | 280/740 |

Primary Examiner—Margaret A. Focarino
Assistant Examiner—Christopher P. Ellis
Attorney, Agent, or Firm—Charles E. Leahy

[57] ABSTRACT

An occupant restraint air bag assembly includes an air bag having a base wall portion communicating with an inflator and an occupant contacting face wall for contact with the occupant upon inflation of the bag. The air bag also has an internal dividing wall which divides the air bag into a first chamber communicating directly with the inflator and a second chamber defined between the dividing wall and the occupant contacting face wall. A first opening in the dividing wall between the chambers communicate inflation gas from the first chamber to the second chamber to inflate the second chamber. A second opening in the dividing wall is normally closed by a vent flap which is operably connected to the occupant contacting face wall so that the inflation of the second chamber and resultant travel of the face wall toward the occupant and away from the dividing wall will move the valve flap to an open position by which the inflation gas is communicated into the second chamber through both the first opening and the second opening during the further inflation of the bag.

5 Claims, 3 Drawing Sheets

MULTI-CHAMBER AIR BAG WITH DISPLACEMENT RESPONSIVE VALVE

The invention relates to a vehicle air bag and more particularly provides a two chamber air bag with a valve communicating inflation gas between the chambers in response to the degree of displacement of the air bag toward the occupant.

BACKGROUND OF THE INVENTION

It is well known to provide an inflatable air bag for restraining a vehicle occupant. The air bag assembly includes a folded bag which is connected to a source of inflation gas. Release of the inflation gas into the air bag causes the bag to expand rapidly so that a face wall of the air bag is displaced toward contact with the occupant. It is well known to provide such air bags having internal walls which divide the air bag into various chambers and to provide openings in the walls to communicate inflation gas between the chambers. Prior patents have proposed various arrangements of check valves and pressure relief valves for selectively opening and closing the opening to control the communication of inflation gas between the chambers.

The present invention provides a new and improved air bag assembly in which the degree of opening and closing of the opening communicating between the air bag chambers is dependant upon the displacement of the air bag toward the fully deployed position.

SUMMARY OF THE INVENTION

An occupant restraint air bag assembly includes an air bag having a base wall portion communicating with an inflator providing inflation gas and an occupant contacting face wall for contacting the occupant upon inflation of the bag. The air bag also has an internal dividing wall which divides the air bag into a first chamber communicating directly with the inflator and a second chamber defined between the dividing wall and the occupant contacting face wall. A first opening in the dividing wall between the chambers permits the controlled communication of inflation gas from the first chamber to the second chamber to inflate the second chamber. A second opening in the dividing wall is normally closed by a vent flap which is operably connected to the occupant contacting face wall so that the inflation of the second chamber and resultant travel of the face wall toward the occupant and away from the dividing wall will move the valve flap to an open position by which the inflation gas is communicated into the second chamber through both the first opening and the second opening during the further inflation of the bag. A travel limiting tether is preferably attached to the dividing wall to limit the displacement of the dividing wall and consistently establish the position of the second opening and valve flap. The valve flap is preferably connected to the face wall by a tether of predetermined length chosen to cause the opening of the second opening when the travel of the face wall toward the occupant has progressed to a predetermined degree of the total travel of the occupant face panel.

Accordingly the object, feature and advantage of the invention resides in the provision of a multi-chambered air bag having valving controlling the flow of inflation gas between the chambers in response to the degree of inflation of the air bag.

A further feature object and advantage of the invention resides in the provision of an air bag having divided into a chamber closest the inflator and a chamber closest the occupant, with openings and valving acting between the chambers in a manner to limit the size of the flow opening until the occupant contacting wall of the air bag has moved away from the inflator by a predetermined distance toward the occupant.

BRIEF DESCRIPTION OF THE DRAWINGS

These and other features, objects and advantages of the invention will become apparent upon consideration of the description of the preferred embodiment of the invention and the appended drawings in which.

DESCRIPTION OF THE PREFERRED EMBODIMENT

Figure 1:
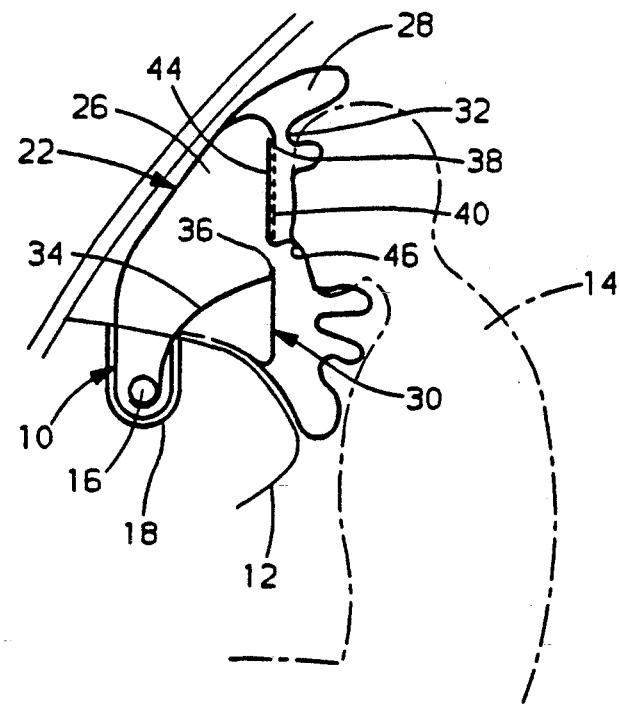
FIG. 1 is a sectional view taken through the air bag and showing in schematic form the inflation of the air bag in which limited travel of the air bag occurs due to occupant position.

FIG. 1 shows a schematic representation of a vehicle body air bag system in which an air bag module generally indicated at 10 is mounted in a recess in the top surface of an instrument panel 12 located forward of an occupant 14. The air bag module 10 generally includes an inflator 16 which generates inflation gas and is mounted in a housing or canister 18. An air bag 22 of flexible fabric material is suitably mounted on the module 10 and is normally folded upon itself to overlie the inflator 16 in a stored condition beneath the outer surface of the instrument panel. FIG. 1 shows the air bag 22 having been unfolded and deployed through the instrument panel toward the occupant by inflation gas upon activation of the inflator 16.

Figure 2:
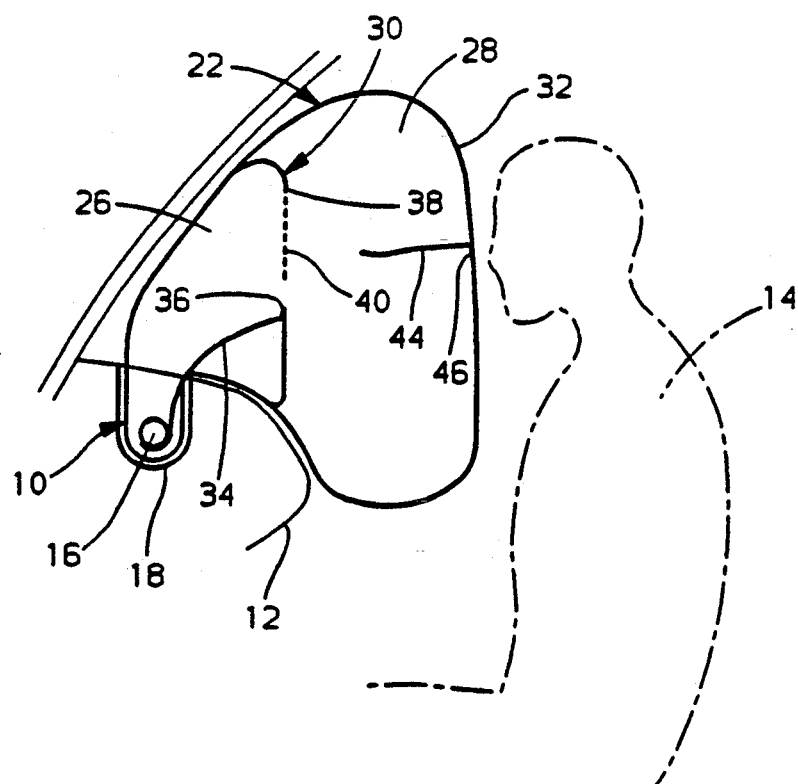
FIG. 2 is a view similar to FIG. 1 but showing the further inflation of the air bag toward an occupant seated further from the module, thus opening the valve flap in the dividing wall between the air bag chambers.

As best seen in FIG. 2 the air bag 22 is divided into a first chamber 26 and a second chamber 28 by a vertical dividing wall 30. The first chamber 26 communicates directly with the inflator 16 to receive the inflation gas therefrom, while the second chamber 28 is separated from the inflator 16 by the dividing wall 30. The second chamber 28 is situated between the dividing wall 30 and a occupant contacting face wall 32 of the air bag 22. A travel limiting tether strap 34 has one end attached to the inflator 16 and the other end attached to the dividing wall 30 and functions to limit the travel of the dividing wall 30 toward the occupant so that the dividing wall 30 is established in the vertical position of FIG. 2 against the forces of the inflation gas acting thereon.

The dividing wall 30 has a first opening 36 provided therein which communicates inflation gas from the first chamber 26 to the second chamber 28. In addition, the dividing wall has a second opening 38 therein provided by a open mesh screen 40.

In FIG. 1 it is seen that the second opening 38 provided by the open mesh screen 40 is closed by a valve flap 44 which reaches through the first opening 36 and overlies the upstream side of the second opening 38 to block the flow of inflation gas through the open mesh screen 40. As best seen in FIG. 2, the valve flap 44 has an end 46 sewn or otherwise suitably attached to the occupant contacting face wall 32 so that the travel of the occupant contacting face wall 32 to the position of FIG. 2 will have pulled the valve flap 44 away from overlying the second opening 38 so that the inflation gas is free to pass from the first chamber 26 to the second chamber 28 through both the first opening 36 and the second opening 38. Thus, the valve flap and the second opening 38 cooperates to define a closure which is initially normally closed to block gas communications, but then opens to permit gas communication.

Figure 3:
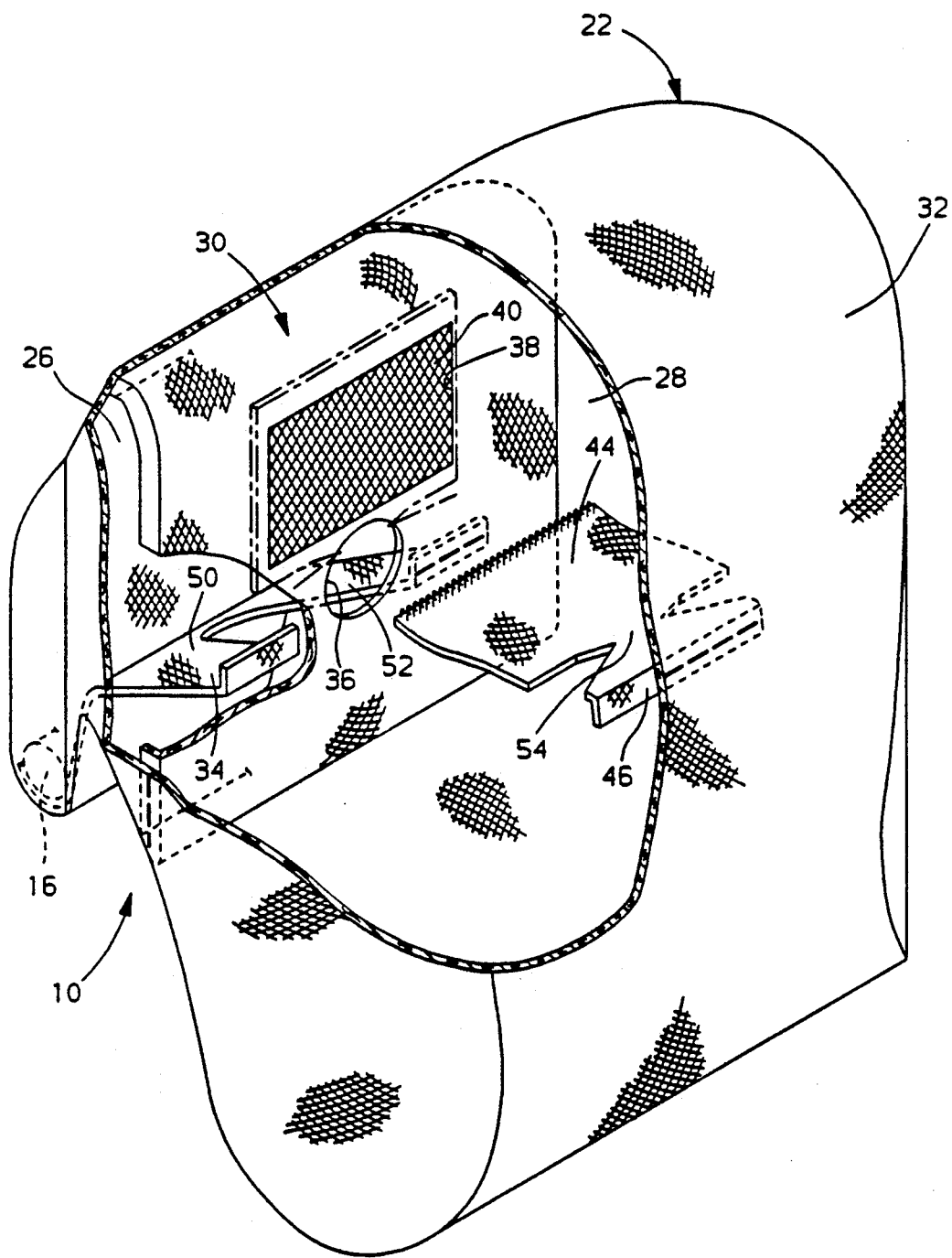
FIG. 3 is a perspective view of the air bag of FIG. 1 showing the construction in greater detail.

FIG. 3 is a perspective view of the air bag shown in the fully inflated position of FIG. 2 and having parts broken away and in section to show in greater detail the construction of the air bag 22. As best seen in FIG. 3 the travel limiting tether strap 34 is preferably comprised of a piece of air bag type fabric which includes laterally spaced apart legs 50 and 52 which are sewn or otherwise suitably attached to the dividing wall 30 at laterally spaced locations to support the dividing wall 30 at its vertical position of FIGS. 1 and 2. Furthermore, FIG. 3 shows that the first opening 36 is preferably a round opening which is situated beneath and centered with respect to the second opening 38. In the predeployment folded condition, the valve flap 44 will reach through the first opening 36 and be unfolded to overlie the open mesh screen 40 of the second opening 38. The edges of the valve flap 44 are preferably tacked to the vertical wall 30 by a row of stitches, adhesive, velcro or other suitable fastener which can be forcibly separated when the valve flap 44 is to be moved away from the second opening 38. Furthermore, as best seen in FIG. 3 the valve flap 44 includes a tether portion 54 which is necked down to reach through the opening 36 without substantially reducing the cross sectional flow area of the first opening 36.

In comparing FIG. 1 and FIG. 2, it will be appreciated that the length of the valve flap 44 and or its tether 54 may be varied as desired to determine the degree of movement of the occupant face wall 32 away from the dividing wall 30 which will result in the valve flap 44 being tensioned and pulled through the first opening 36 to open the second opening 38.

Furthermore, it will be appreciated that tether having a predetermined length chosen to cause opening of the closure when the travel of the face wall toward the occupant has progressed to a predetermined degree of the total travel of the occupant face panel so that the further inflation of the second chamber is obtained by the combined communication of inflation gas through both the first opening and the second opening, and to cause the closure to remain closed during any degree of lesser progress of the face wall so that the inflation of the second chamber is obtained only by inflation gas communication through the first opening.

Figure 4:
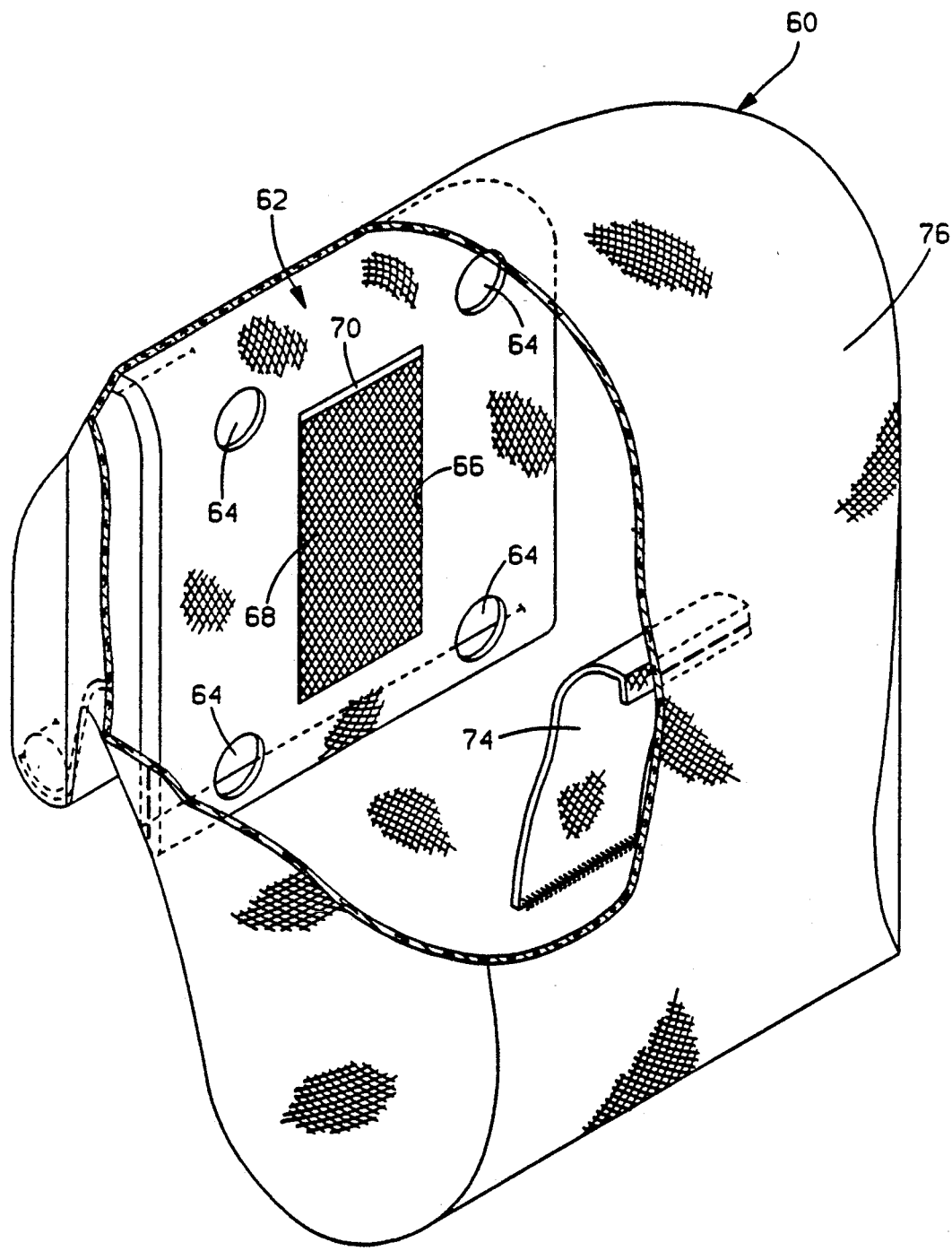
FIG. 4 is a view similar to FIG. 3 but showing a second embodiment of the invention.

FIG. 4 shows an alternative embodiment of the invention in which an air bag 60 has a vertical dividing wall 62 having a plurality of first openings 64 spaced circumferentially about the secondary opening 66. The open mesh screen 68 which extends across the opening 66 stops short at the top thereof to leave a gap 70 through which the valve flap 74 reaches to overlie the open mesh screen 66. The aggregate cross sectional area of the first openings 64 will control and limit the flow of inflation gas from the first chamber to the second chamber until such time as the travel of the occupant contacting face wall 76 has progressed away from the dividing wall 62 sufficient to pull the movable flap 74 out of closing engagement with the open mesh screen 68 of the second opening 66.

It will be appreciated that the use of the multi-chamber arrangement disclosed herein, and the displacement responsive valving arrangement for the dividing wall between the chambers permits the tuning of the air bag system to a wide range of desired performance characteristics. For example the size, shape, number, and spacing of the vent openings may be varied. In addition, the length of the valve flap and its tether portion may be varied to vary the degree of movement of the occupant contact face wall which triggers the opening of the valve flap. In addition, the material of the valve flap can be chosen to be either a gas permeable or impermeable material.

Furthermore, although the drawings herein show an air bag comprised of two chambers it will be appreciated that three, four or any multiple number of chambers may be employed and may have associated primary flow openings which are open and secondary normally closed flow openings which are opened by a valve in response to the relative displacement between different wall portions of the air bag.

In addition, it will be understood that the addition of a dividing wall in the air bag is only one example of how the separate chambers may be fabricated. Alternately, two chambers could be achieved by using a smaller complete bag within the larger complete bag, each having top, bottom and side walls so that the inner smaller bag would parade the dividing wall between the chambers. The valve arrangement described here could then be utilized in a similar fashion.

In addition it will be appreciated that the particular closure valve arrangement shown herein is just one example of suitable valve arrangement which may be installed in the dividing wall. Although the valve flap preferably reaches through an access opening such as the first opening 36 of FIG. 3, or the gap 70 of FIG. 4, it will be appreciated that the valve flap could close the secondary opening on the downstream side thereof within the second chamber.

Furthermore it will be understood that the valve assembly shown herein is only one example of a suitable valve assembly, and other valve assemblies such as that of U.S. patent application Ser. No. 07/981,336 by Michael John Wolanin et al filed Nov. 25, 1992 and assigned to the assignee of this invention, may be employed in the air bag assembly hereof.

Thus it is seen that the invention provides a new and improved air bag assembly.

We claim:

1. An occupant restraint air bag comprising:
    an inflator for generating inflation gas;
    an air bag having a first chamber receiving inflation gas from the inflator and a second chamber separated from the first chamber by a wall,
    a first opening in the wall between the chambers to permit the controlled communication of inflation gas from the first chamber to the second chamber to inflate the second chamber,
    a second opening in the wall between the chambers and having a closure normally closed to communication of the inflation gas from the first chamber to the second chamber,
    and a tether located within the second chamber and having a first end operably associated with the closure and a second end attached to the air bag so that the inflation of the second chamber and consequent travel of the air bag pulls the tether to open the closure and permit communication of inflation gas through both the first and second openings.

2. An occupant restraint air bag comprising:

an inflator for generating inflation gas;

an air bag having an occupant contacting face wall for displacement toward the occupant upon inflation of the air bag, said air bag having a dividing wall dividing the air bag into a first chamber communicating with the inflator to receive inflation gas and a second chamber defined between the dividing wall and the occupant contacting face wall, a first opening in the wall between the chambers to permit the controlled communication of inflation gas from the first chamber to the second chamber to inflate the second chamber and displace the face wall toward the occupant, a travel limiting tether attached to the dividing wall to limit the displacement of the dividing wall, a second opening in the wall between the chambers and having a closure normally closed to block communication of the inflation gas from the first chamber to the second chamber, and a tether located within the second chamber and having a first end operably associated with the closure and a second end attached to the face wall so that the inflation of the second chamber and consequent displacement of the face wall toward the occupant pulls the tether to open the closure and permit communication of inflation gas through both the first and second openings to further inflate the air bag.

3. The occupant restraint air bag of claim 2 further characterized by the tether having a predetermined length chosen to cause opening of the closure when the travel of the face wall toward the occupant has progressed to a predetermined degree of the total travel of the occupant face panel so that the further inflation of the second chamber is obtained by the combined communication of inflation gas through both the first opening and the second opening, and to cause the closure to remain closed during any degree of lesser travel of the face wall so that the inflation of the second chamber is obtained only by inflation gas communication through the first opening.

4. An occupant restraint air bag comprising:

an inflator for generating inflation gas;

an air bag having an occupant contacting face wall for displacement toward the occupant upon inflation of the air bag, said air bag having a dividing wall dividing the air bag into a first chamber communicating with the inflator to receive inflation gas and a second chamber defined between the dividing wall and the occupant contacting face wall, a first opening in the dividing wall between the chambers to permit the controlled communication of inflation gas from the first chamber to the second chamber to inflate the second chamber and displace the face wall toward the occupant, a valve opening in the dividing wall between the chambers and having an associated valve flap normally closed to block communication of the inflation gas through the valve opening from the first chamber to the second chamber, and means acting between the valve flap and the occupant face wall so that the inflation of the second chamber and consequent displacement of the face wall toward the occupant travel of the air bag pulls the valve flap away from the valve opening to open the valve opening and permit communication of inflation gas through both the first and second openings to further inflate the air bag.

5. An occupant restraint air bag comprising:

an inflator for generating inflation gas;

an air bag having an occupant contacting face wall for displacement toward the occupant upon inflation of the air bag, said air bag having a dividing wall dividing the air bag into a first chamber communicating with the inflator to receive inflation gas and a second chamber defined between the dividing wall and the occupant contacting face Wall, a first opening in the dividing wall between the chambers to permit the controlled communication of inflation gas from the first chamber to the second chamber to inflate the second chamber and displace the face wall toward the occupant, a valve opening in the dividing wall between the chambers, a mesh screen attached to the dividing wall and extending across the valve opening, an access opening located adjacent the mesh screen, a valve flap reaching through the access opening in the dividing wall and having a first end located in the first chamber and overlying the mesh screen to block communication of the inflation gas through the valve opening from the first chamber to the second chamber and a second end attached to the occupant face wall so that the inflation of the second chamber and consequent displacement of the face wall toward the occupant pulls the valve flap away from the mesh screen and through the access opening to open the valve opening and permit communication of inflation gas through both the first and second openings.

* * * * *